(12) United States Patent
Yang et al.

(10) Patent No.: US 7,317,755 B2
(45) Date of Patent: Jan. 8, 2008

(54) PREDICTED PARALLEL BRANCH SLICER AND SLICING METHOD THEREOF

(75) Inventors: Meng-Da Yang, Miaoli (TW); An-Yeu Wu, Taipei (TW); Murphy Chen, Taipei (TW)

(73) Assignee: Via Technologies, Inc., Taipei (TW)

( * ) Notice: Subject to any disclaimer, the term of this patent is extended or adjusted under 35 U.S.C. 154(b) by 875 days.

(21) Appl. No.: 10/442,560

(22) Filed: May 21, 2003

(65) Prior Publication Data

US 2004/0234002 A1 Nov. 25, 2004

(51) Int. Cl.
*H03H 7/30* (2006.01)
(52) U.S. Cl. .................................... 375/229
(58) Field of Classification Search ........ 375/229–236, 375/316, 346, 348, 350
See application file for complete search history.

(56) References Cited

U.S. PATENT DOCUMENTS

| | | | | |
|---|---|---|---|---|
| 5,191,462 A * | 3/1993 | Gitlin et al. | ................ | 398/209 |
| 6,256,342 B1 * | 7/2001 | Schlag et al. | ................ | 375/229 |
| 6,987,804 B2 * | 1/2006 | Buchali et al. | ............. | 375/233 |
| 7,020,402 B2 * | 3/2006 | Shanbhag et al. | .......... | 398/181 |
| 7,130,366 B2 * | 10/2006 | Phanse et al. | .............. | 375/350 |
| 2003/0189997 A1 * | 10/2003 | Shanbhag et al. | .......... | 375/348 |
| 2003/0235145 A1 * | 12/2003 | Shanbhag et al. | .......... | 370/201 |
| 2004/0001538 A1 * | 1/2004 | Garrett | ....................... | 375/229 |

OTHER PUBLICATIONS

Shanbhag, Naresh R., et al., "Pipelined Adaptive DFE Architectures Using Relaxed Look-Ahead," IEEE Transactions on Signal Processing, vol. 43, No. 6, Jun. 1995, pp. 1368-1385.

* cited by examiner

*Primary Examiner*—Chieh M. Fan
*Assistant Examiner*—Jason M. Perilla
(74) *Attorney, Agent, or Firm*—Kirton & McConkie; Evan R. Witt

(57) ABSTRACT

A predicted parallel branch slicer for use in an adaptive decision feedback equalizer includes $M^k$ adders commonly receiving a signal to be processed and respectively receiving $M^k$ preset values, and performing respective addition operations to generate $M^k$ output signals; $M^k$ slicers in communication with the $M^k$ adders, receiving and processing the $M^k$ output signals to obtain $M^k$ signals of $M^k$ levels, respectively; a multiplexer in communication with the $M^k$ slicers, receiving the signals of the $M^k$ levels; and k delay units interconnected with one another in series and being in communication with the multiplexer, and generating k selection signals of different delay time in response to an output of the multiplexer, the selection signals being provided for the multiplexer to select one of the signals of the $M^k$ levels to be outputted.

14 Claims, 11 Drawing Sheets

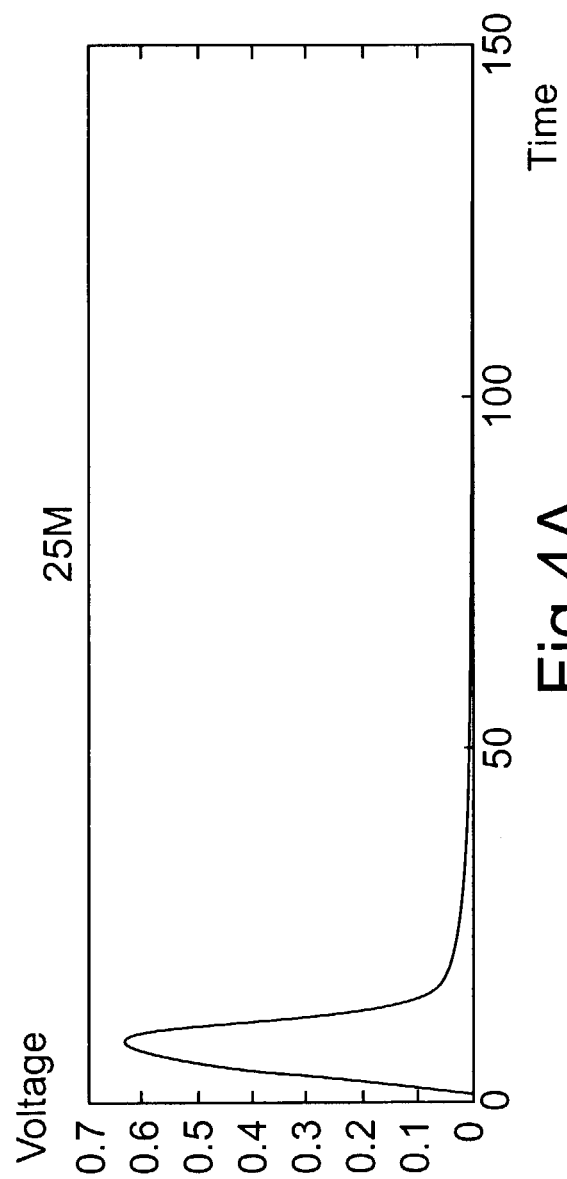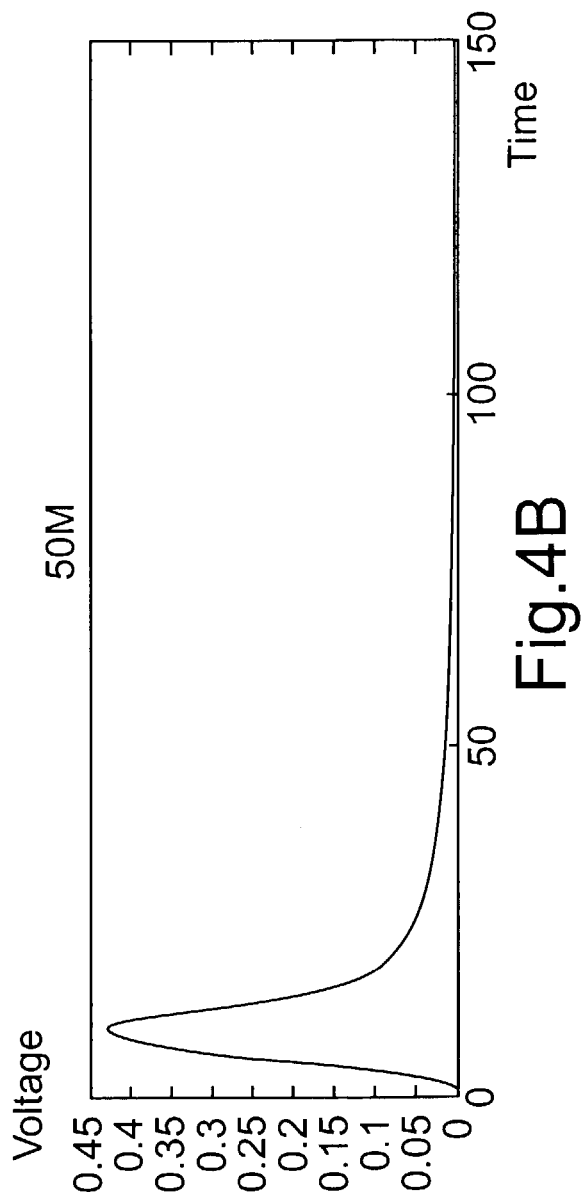

PREDICTED PARALLEL BRANCH SLICER AND SLICING METHOD THEREOF

FIELD OF THE INVENTION

The present invention relates to a predicted parallel branch slicer, and more particularly to a predicted parallel branch slicer for use in an adaptive decision feedback equalizer (DFE) for properly slicing signals. The present invention also relates to a slicing method of a predicted parallel branch slicer for use in an adaptive DFE.

BACKGROUND OF THE INVENTION

Recently, the Institute of Electric and Electronic Engineers stipulated a transmission standard of Gigabit Ethernet. In this transmission standard, four unshield twisted pair-category 5 (UTP-CAT5) transmission lines are used to transmit data at a rate of giga bits per second. For complying with such high speed transmission, the transceiver of each node has to overcome the noise problems resulting from, for example, inter-symbol interference (ISI), echo, near-end cross talk (NEXT) and far-end cross talk (FEXT) phenomena.

Please refer to FIG. 1A which is a functional block diagram schematically showing a transceiver of a node in a Gigabit Ethernet. In the signal receiving path, an analog signal is processed by the UTP-CAT5 transmission lines 10, hybrid 11, analog front end (AFE) 12 and analog-to-digital converter (ADC) into a digital data signal x(n) essentially suffered from the ISI phenomena (The FEXT phenomena can be ignored). The digital data signal x(n) is transmitted to the subsequent adaptive decision feedback equalizer (ADFE) 16 to be further processed in order to remove the ISI effect, and then transmitted to be processed by the downstream decoder 17, packet and cell switch (PCS) 18 and medium access controller 19. Finally, the processed digital data is transmitted to the network node itself, e.g. a personal computer. The PCS 18 also outputs some signals which pass through an adaptive echo canceller 14 and an adaptive NEXT canceller 15 and then enter the ADFE 16. FIG. 1B shows the waveform diagram of the channel impulse response of a digital data signal x(n). The left portion from the dash line is so called as precursor ISI, and the right portion from the dash line is so called as postcursor ISI.

Please refer to FIG. 2A which is a schematic functional block diagram of a conventional adaptive decision feedback equalizer. The conventional ADFE uses a feed forward equalizer (FFE) 21 and a feed back equalizer (FBE) 22 to eliminate the precursor ISI and postcursor ISI, respectively. The coefficients of the FEE 21 and FBE 22 are determined and refreshed by a first and a second coefficient refresher 23 and 24 according to the error signal e(n) and the previous values thereof. The slicer 25 quantizes the signal y(n) to recover the digital data signal d(n). The operational principle of the ADFE shown in FIG. 2A is based on least-mean-square (LMS) algorithm, involving the following equations:

$$y(n) = \sum_{k=0}^{N_f-1} x(n-k)w_k(n) - \sum_{k=1}^{N_b-1} d(n-k)f_k(n)$$

$$d(n) = Q[y(n)]$$

$$e(n) = d(n) - y(n)$$

-continued $$w_k(n+1) = w_k(n) + \mu x(n-k)e(n)$$

$$f_k(n+1) = f_k(n) + \mu d(n-k)e(n).$$

The data-processing rate of this ADFE is confined by the bandwidth of the decision feedback loop (DLP), and thus is limited within a certain level. In order to solve this problem, a pipeline method is developed, which is referred to FIG. 2B. FIG. 2B shows another conventional adaptive decision feedback equalizer. The detailed description of the pipeline method is referred to Naresh R. Shanbhag, Keshab K. Parhi, "Pipelined adaptive DFE architectures using relaxed look-ahead," *IEEE Trans. Signal Processing*, vol. 43, No. 6, pp. 1368-1385, June 1995, which is incorporated herein for reference. Different from the ADFE of FIG. 2A, k delay units are additionally provided for the decision feedback loop (DLP). It is to be noted that the additional k delay units are shown outside the FBE 22 in FIG. 2B for simplifying the drawing. In practice, however, the additional k delay units are generally arranged inside the FBE 22. Accordingly, the FBE 22 is divided into (k+1) groups of sub-circuits with a delay unit in each sub-circuit. The pipeline operation is performed with the (k+1) groups of sub-circuits, so as to improve the overall processing speed.

This pipeline method, although has relatively high processing rate, suffers from a low signal-to-noise ratio. Due to the increased delay time, the waveform response of the FBE 22 will become the one illustrated in FIG. 2C. Since the presence of the additional k delay units, the postcursor ISI relating to the delay time of preceding k delay units is limited to zero, as indicated by the arrow in FIG. 2C. Accordingly, the FBE cannot perform well, and so as to reduce the overall signal-to-noise ratio of the system and deteriorate the signal quality. Modification on the FFE 21 may alleviate the problem, but make the circuitry of the FFE 21 even more complicated. Moreover, the signal quality has not been significantly improved.

SUMMARY OF THE INVENTION

Therefore, an object of the present invention is to provide an adaptive decision feedback equalizer, which has a high signal-to-noise ratio and a processing speed complying with the requirement of Gigabit Ethernet.

According to a first aspect of the present invention, a predicted parallel branch slicer for use in an adaptive decision feedback equalizer comprises adders of a number of an expression $M^k$, where M is a base greater than one and k is an exponent, commonly receiving a signal to be processed and respectively receiving $M^k$ preset values, and performing respective addition operations to generate $M^k$ output signals; slicers of a number of the expression $M^k$, in communication with the $M^k$ adders, receiving and processing the $M^k$ output signals to obtain $M^k$ signals of $M^k$ levels, respectively; a multiplexer in communication with the $M^k$ slicers, receiving the signals of the $M^k$ levels; and delay units of a number k, interconnected with one another in series and being in communication with the multiplexer, and generating k selection signals of different delay time in response to an output of the multiplexer, the selection signals being provided for the multiplexer to select one of the signals of the $M^k$ levels to be outputted.

Preferably, the $M^k$ adders are $M^k$ adders with constant coefficients.

Preferably, the signals of the $M^k$ levels at least include a plurality of data signals of the $M^k$ levels and a plurality of error signals of the $M^k$ levels.

Preferably, the multiplexer is a combination of a first multiplexer and a second multiplexer, which are in communication with the $M^k$ slicers and the k serially interconnected delay units. The first multiplexer receives the data signals of the $M^k$ levels and the selection signals from the delay units, the second multiplexer receives the error signals of the $M^k$ levels and the selections signal from the delay units, and the second multiplexer generates the at least one output according to an output of the first multiplexer.

In accordance with the present invention, the one of the signals of the $M^k$ levels selected to be outputted by the multiplexer is the one including a data signal closest to the selection signals, which means the difference between the selected one and the corresponding selection signal is smallest.

In an embodiment, the one of the signals of the $M^k$ levels selected to be outputted by the multiplexer is the one having an error signal closest to the selection signals, which means they are closet to each other than anyone of other signals of the $M^k$ levels and anyone of other selection signals.

In another embodiment, the one of the signals of the $M^k$ levels selected to be outputted by the multiplexer is the one which is closest to the selection signals, which means the differences between any other signals of the $M^k$ levels and the selection signals is larger than the difference between the one and the selection signals.

Preferably, a value $V_e^T T$ received by each of the $M^k$ adders at a sampled point n is equal to the product of an optimal coefficient $Ve=[C1, C2, \ldots, Ck]$ and a value T of k preceding levels, where $T=[a(n-1), a(n-2), \ldots, a(n-k)]$. More preferably, $C1, C2, \ldots, Ck$ are k constant coefficients realized according to a simulated waveform of a channel impulse response on a transmission line of Gigabit Ethernet stipulated by IEEE.

A second aspect of the present invention relates to a predicted parallel branch slicing method for use in an adaptive decision feedback equalizer. The method comprises steps of realizing the first k coefficients of a feed back equalizer according to a channel feature, and operating to obtain $M^k$ preset values, where M is a base greater than one and k is an exponent; receiving a signal to be processed and the $M^k$ preset values which are operated to obtain $M^k$ output signals; respectively receiving and slicing the $M^k$ output signals to obtain $M^k$ signals of $M^k$ levels; generating a sliced output signal according to the $M^k$ signals of $M^k$ levels; and generating a plurality of selection signals of k kinds of different delay time according to the sliced output signal and k different delay operations, and selecting one of the $M^k$ signals of $M^k$ levels to be outputted.

Compared to the prior art, the present invention performs a pipeline operation of the feed back equalizer by providing additional delay units so as to improve the processing speed. Further, a specially designed predicted parallel branch slicer is used to keep the signal-to-noise ratio at a satisfactory level so as to present from the possible deterioration of signal quality due to pipeline operation. Moreover, the complexity of the circuitry is acceptable (essentially only some slicer and multiplexers are additionally used).

BRIEF DESCRIPTION OF THE DRAWINGS

The present invention may best be understood through the following description with reference to the accompanying drawings, in which:

FIGS. 4A~4D are waveform diagrams showing the channel impulse responses obtained by using different lengths of UTP-CAT5 transmission lines according to the Gigabits Ethernet stipulated by IEEE;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1A:
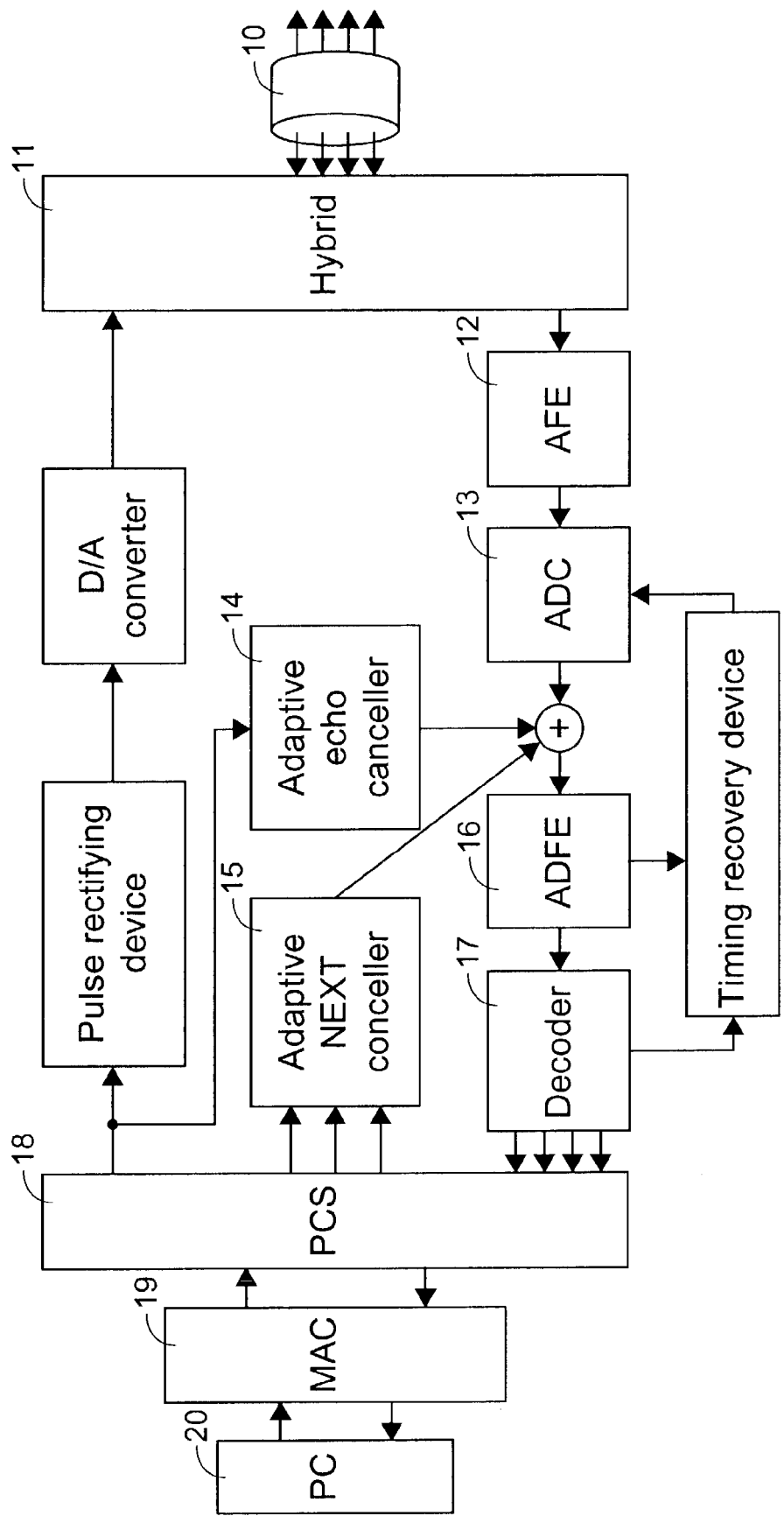
FIG. 1A is a functional block diagram schematically showing a transceiver of a node in a Gigabit Ethernet.
Figure 1B:
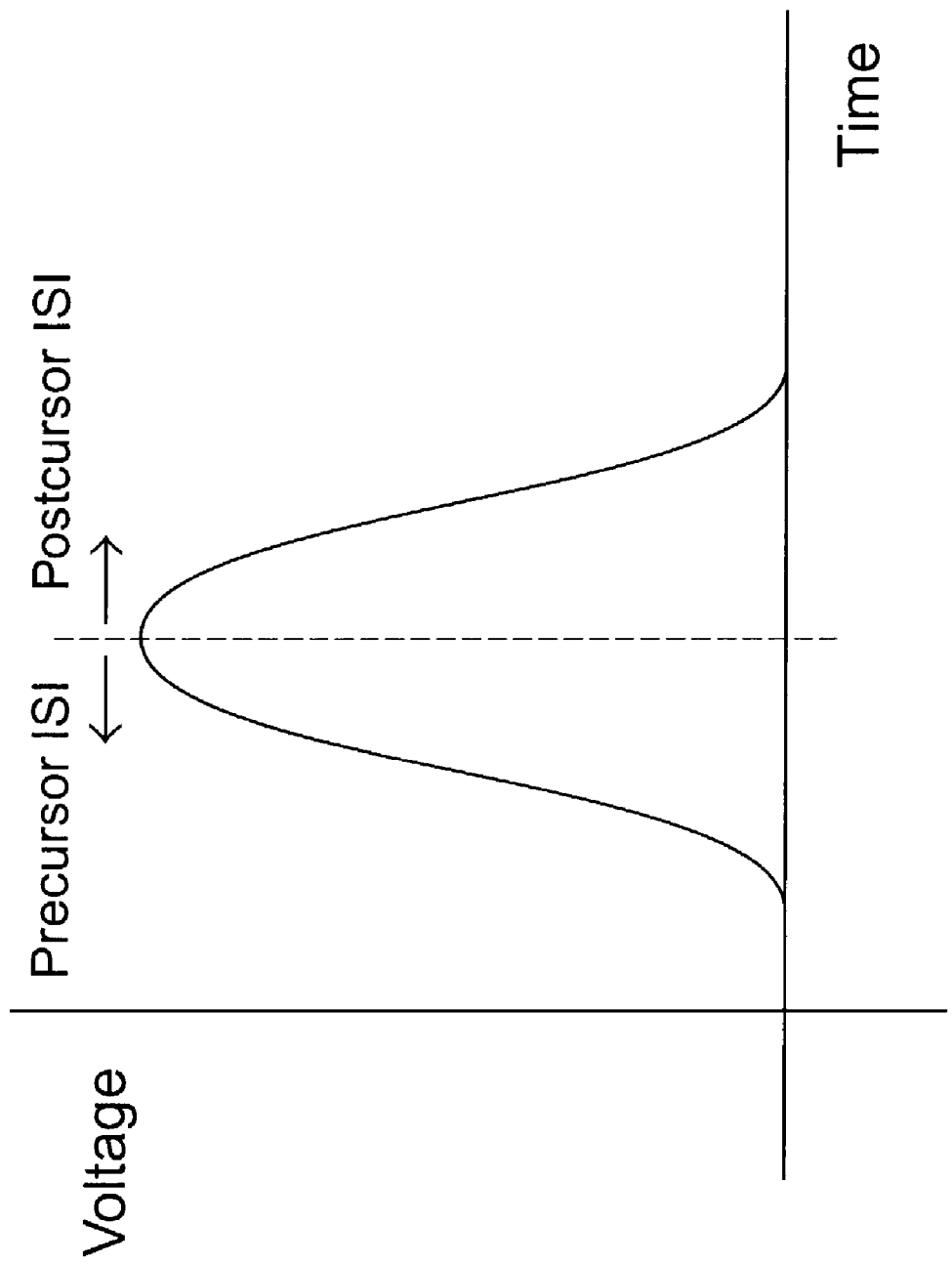
FIG. 1B is a waveform diagram of the channel impulse response of a digital data signal x(n)
Figure 2A:
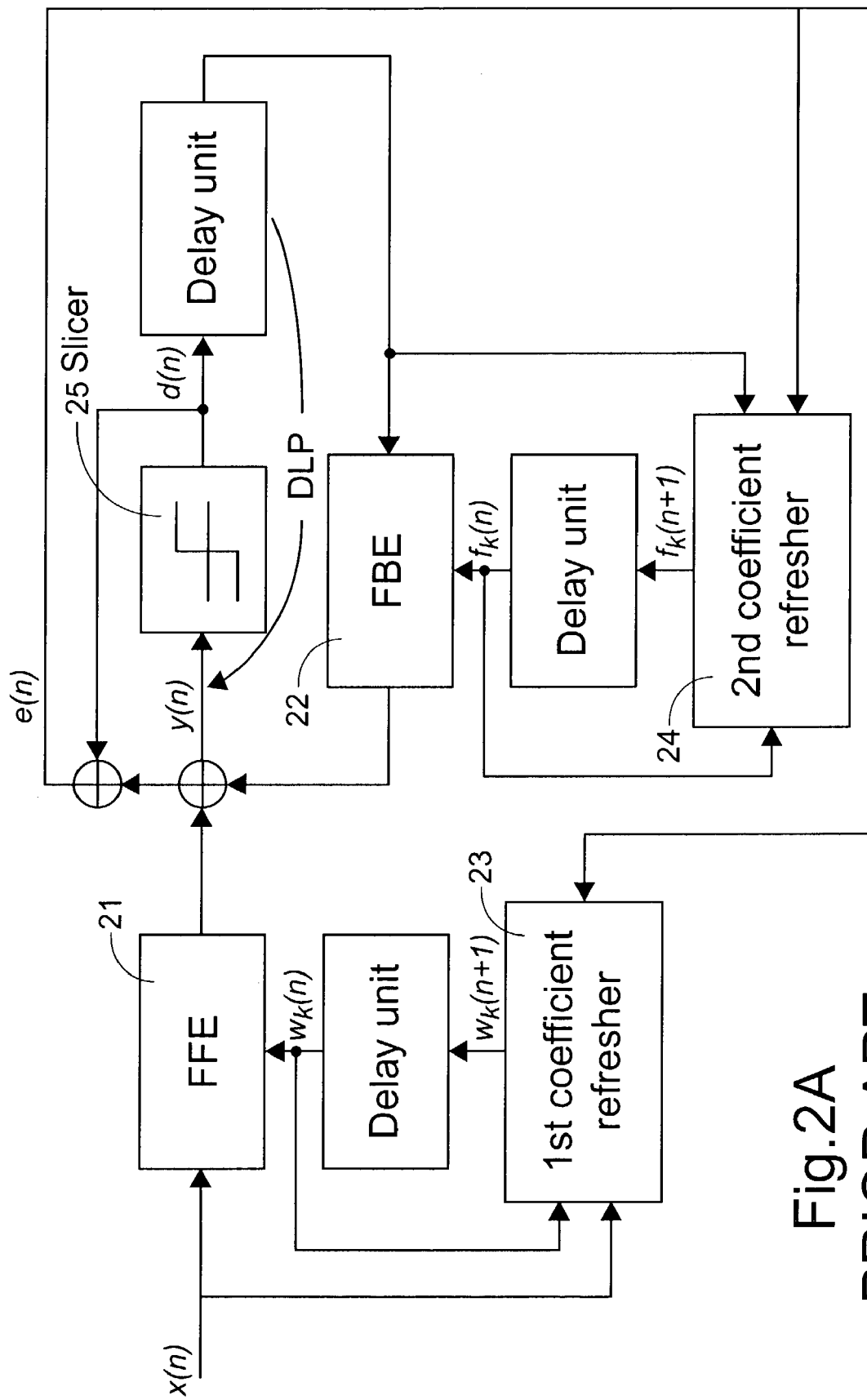
FIG. 2A is a functional block diagram schematically showing a conventional adaptive decision feedback equalizer.
Figure 2B:
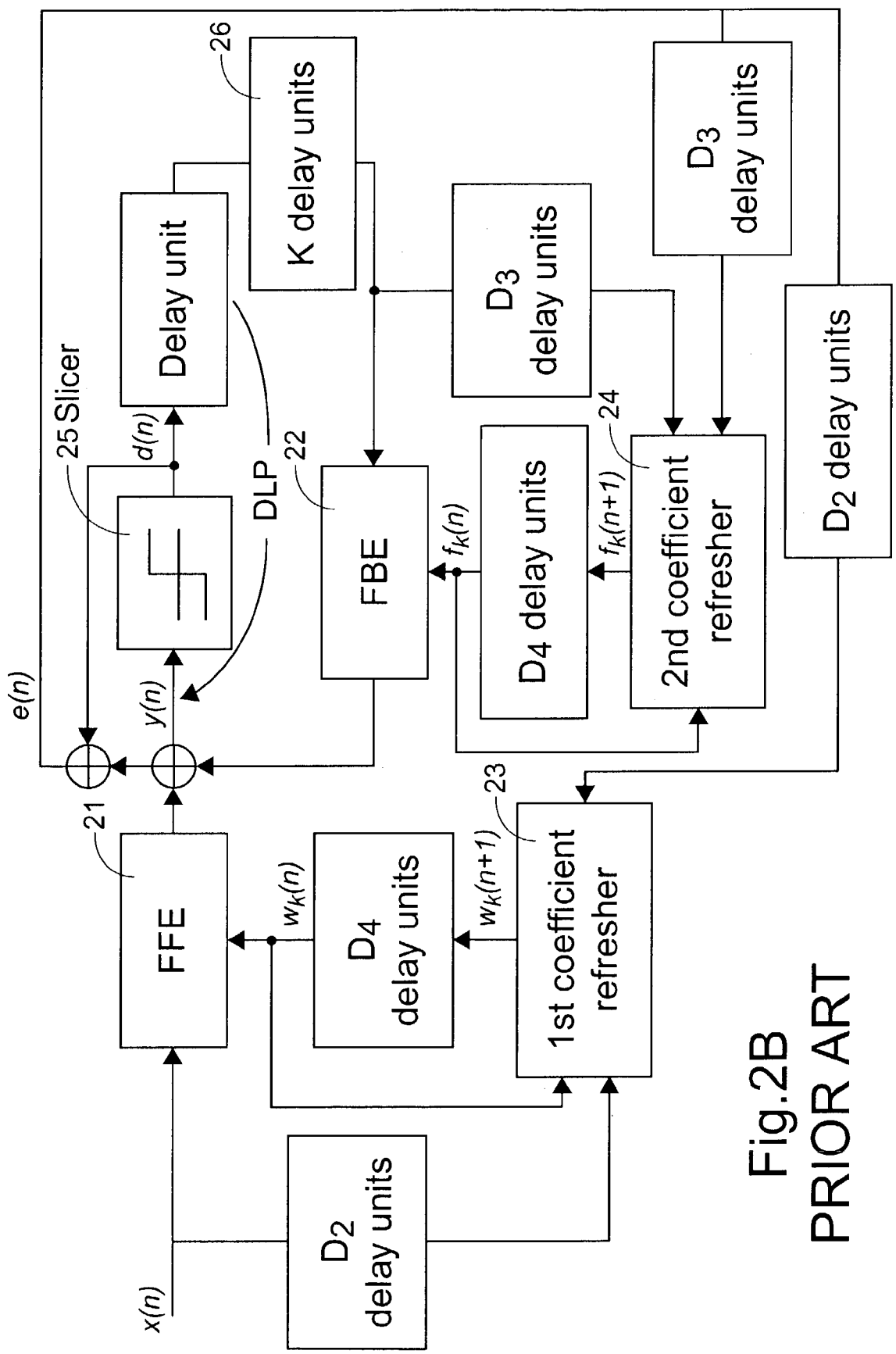
FIG. 2B is a functional block diagram schematically showing another conventional adaptive decision feedback equalizer.
Figure 2C:
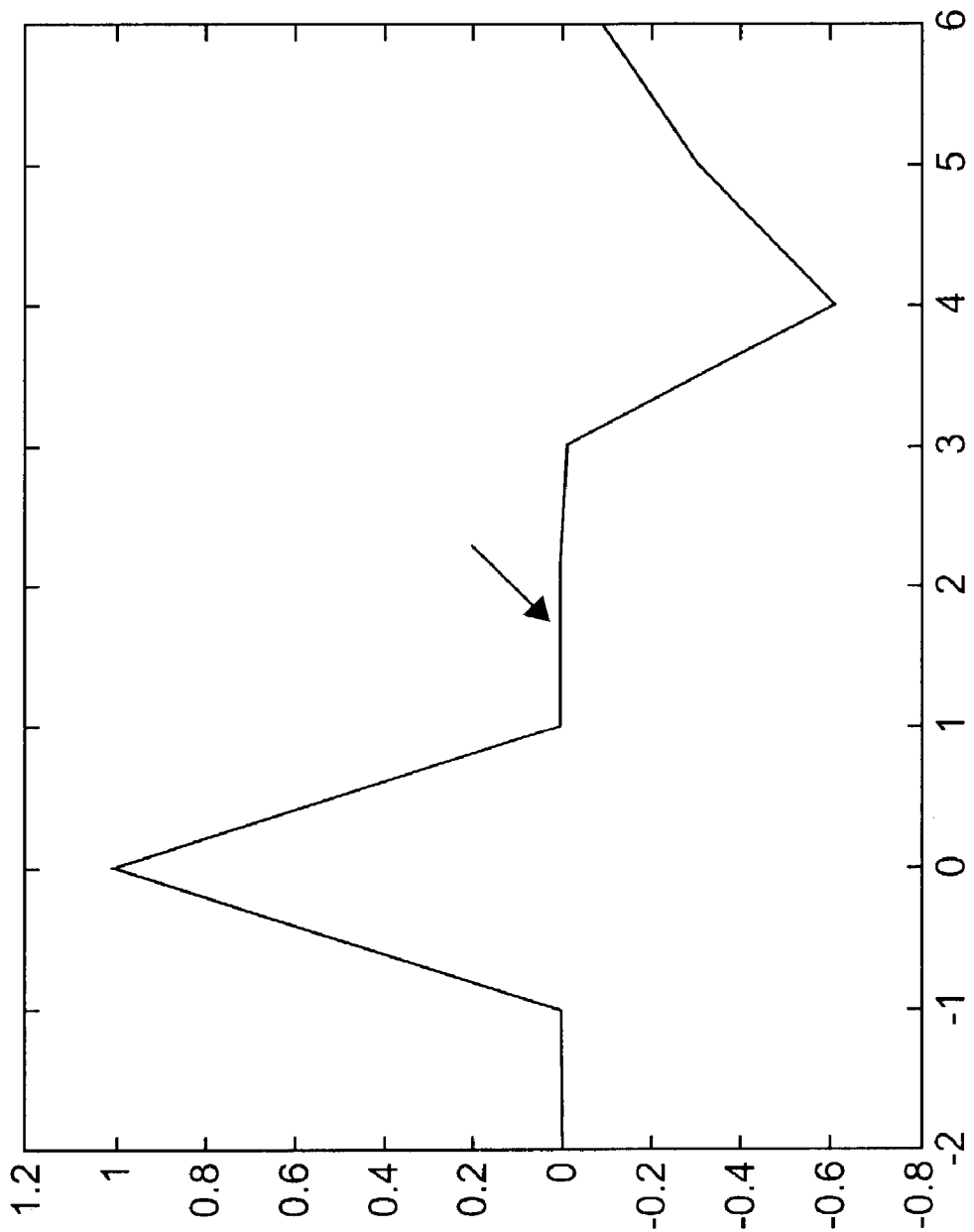
FIG. 2C is an exemplified waveform diagram showing the response variation resulting from unduly increased delay time.
Figure 3:
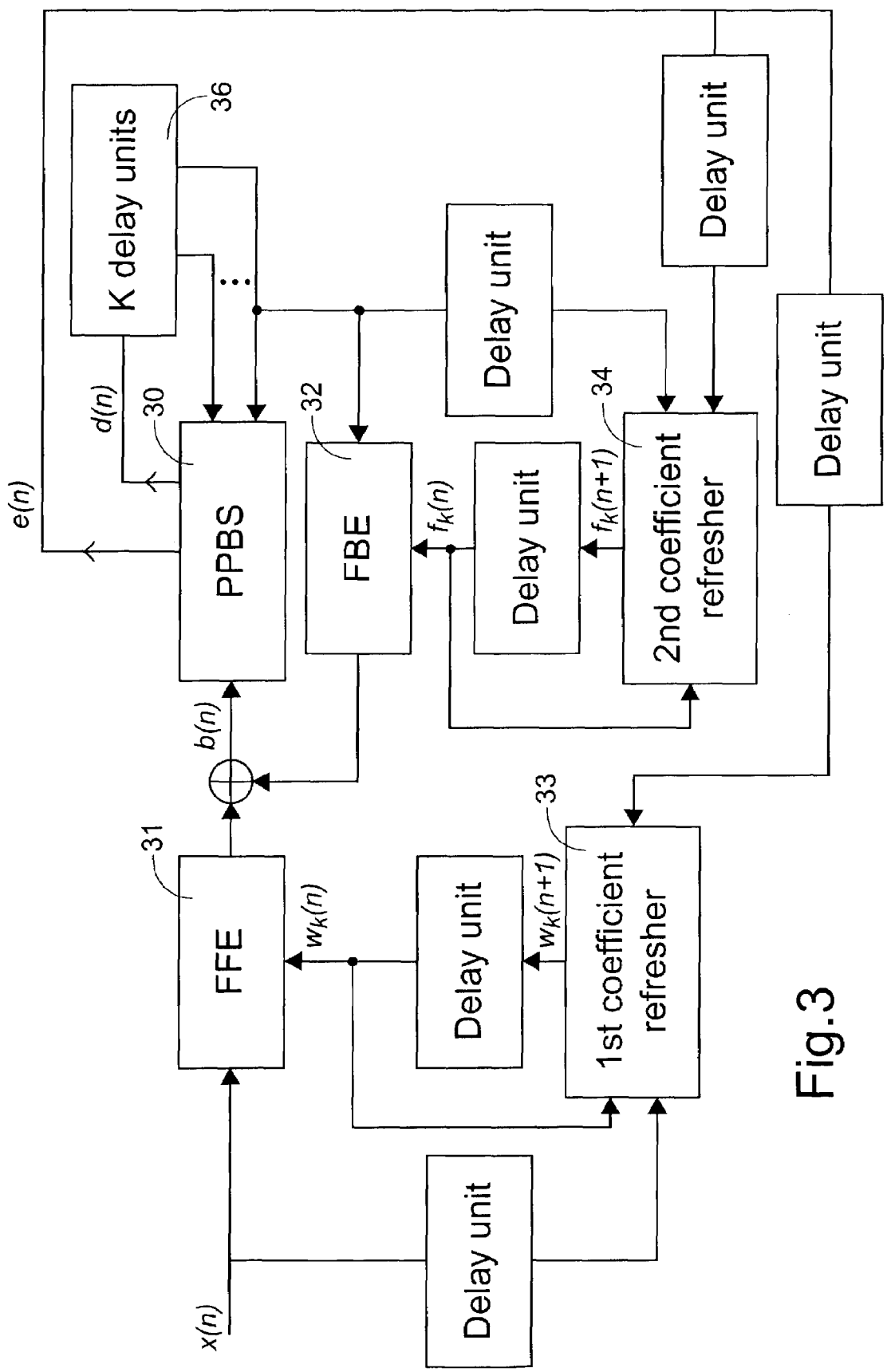
FIG. 3 is a functional block diagram schematically showing an adaptive decision feedback equalizer according to a preferred embodiment of the present invention.
Figure 4C:
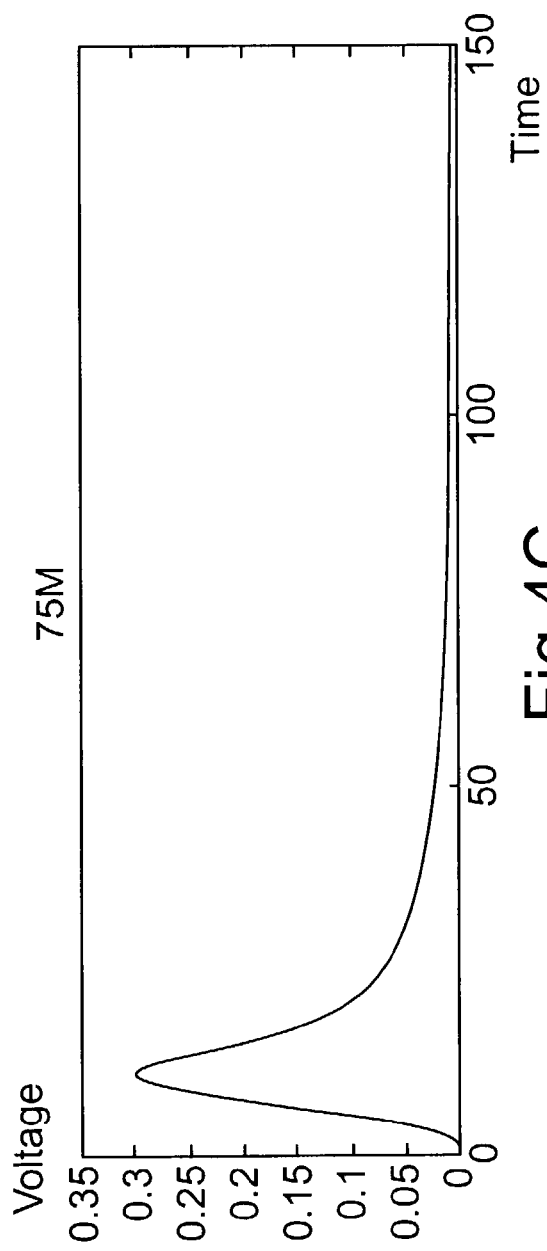
Figure 4D:
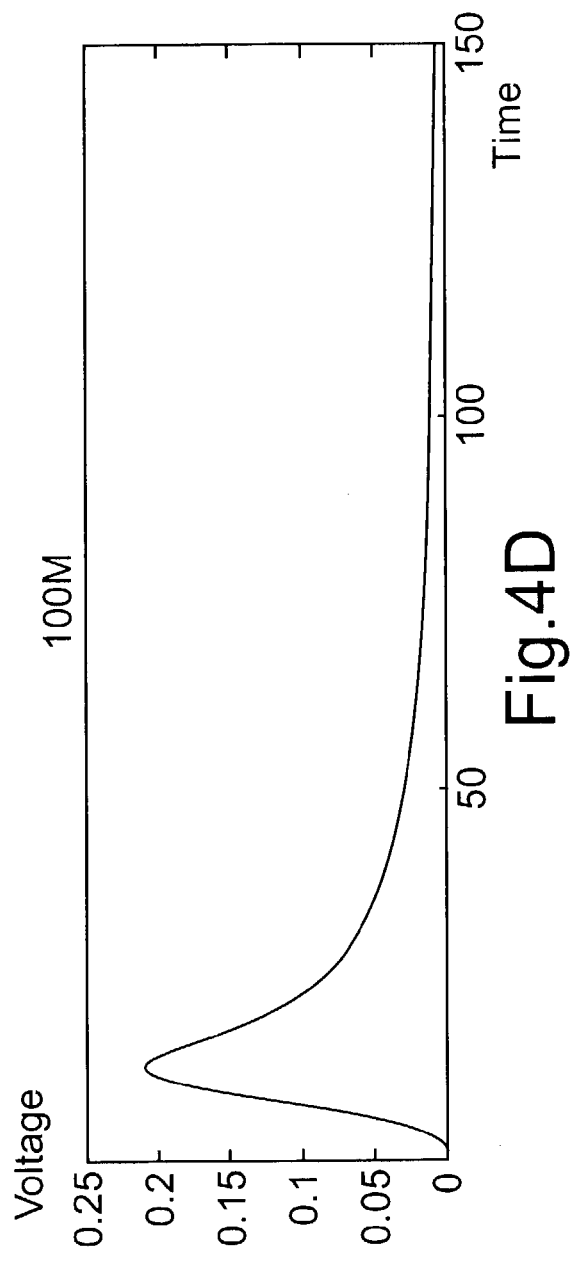
Figure 5:
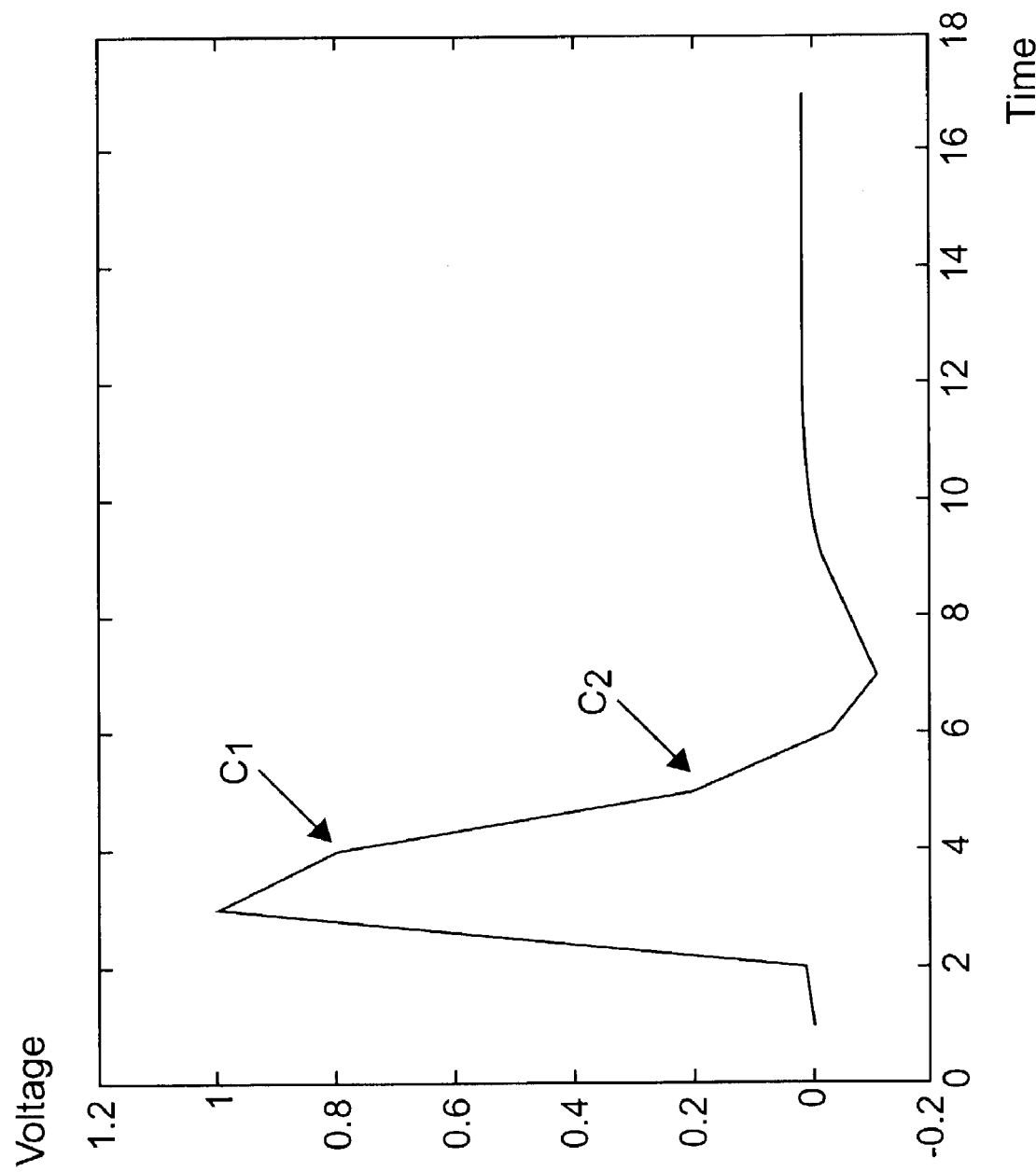
FIG. 5 is an exemplified waveform diagram showing the response variation by using the adaptive decision feedback equalizer of FIG. 3.

Please refer to FIG. 3. The adaptive decision feedback equalizer according to a preferred embodiment of the present invention uses a predicted parallel branch slicer (PPBS) 30 to substitute for the simple slicers of the prior art in order to eliminate the effect of the additional k delay units on the signal-to-analog ratio of the system. In order to clarify the technique and principle of the present invention, please refer to FIGS. 4A~4D first, which are waveform diagrams showing the channel impulse responses obtained by using different lengths of unshield twisted pair-category 5 (UTP-CAT5) transmission lines according to the Gigabits Ethernet stipulated by IEEE. The lengths of the transmission lines shown in FIGS. 4A~4D are 25, 50, 75 and 100 meters, respectively. For FIGS. 4A~4D, the unit of the horizontal axis is time (such as second) and the unit of the vertical axis is voltage (such as volt). It is observed from the figures that the waveforms vary with the lengths of the transmission lines, but the variations are not significant. Therefore, k non-zero constants are preset according to observed waveforms, which are used for simulating the first k coefficients of the response waveform of the combined channel and feed forward equalizer (FFE) 31. It is understood that the response waveform of the combined channel and FFE 31 is equivalent to the waveform entering the downstream feed back equalizer (FBE) 32. By keeping the first k coefficients of the waveform unchanged, the other coefficients of the downstream FBE can be obtained according to the lease mean square (LMS) algorithm. Accordingly, the first k terms of the postcursor ISI can be eliminated by the first k constant coefficients of the FBE (referring to the PPBS 30 described later), and the rest postcursor ISI can be eliminated by the adaptive coefficients of the latter coefficients of the FBE (referring to the FBE 32 described later). For example, when k is equal to 2 and the constant coefficients are C1 and C2, the waveform entering the FBE will be similar to that shown in FIG. 5. The first k coefficients will be very close to the optimal values. Reminded that the first k coefficients of the FBE 22 of FIG. 2B are fixed at zero, which is far way from the practice, the signal-to-noise ratio is thus adversely reduced. By the present invention, this problem can be solved. Next, the equalizer with the first k constant coefficients is transformed into the predicted parallel branch slicer 30 to introduce pipeline process into the FBE.

Figure 6A:
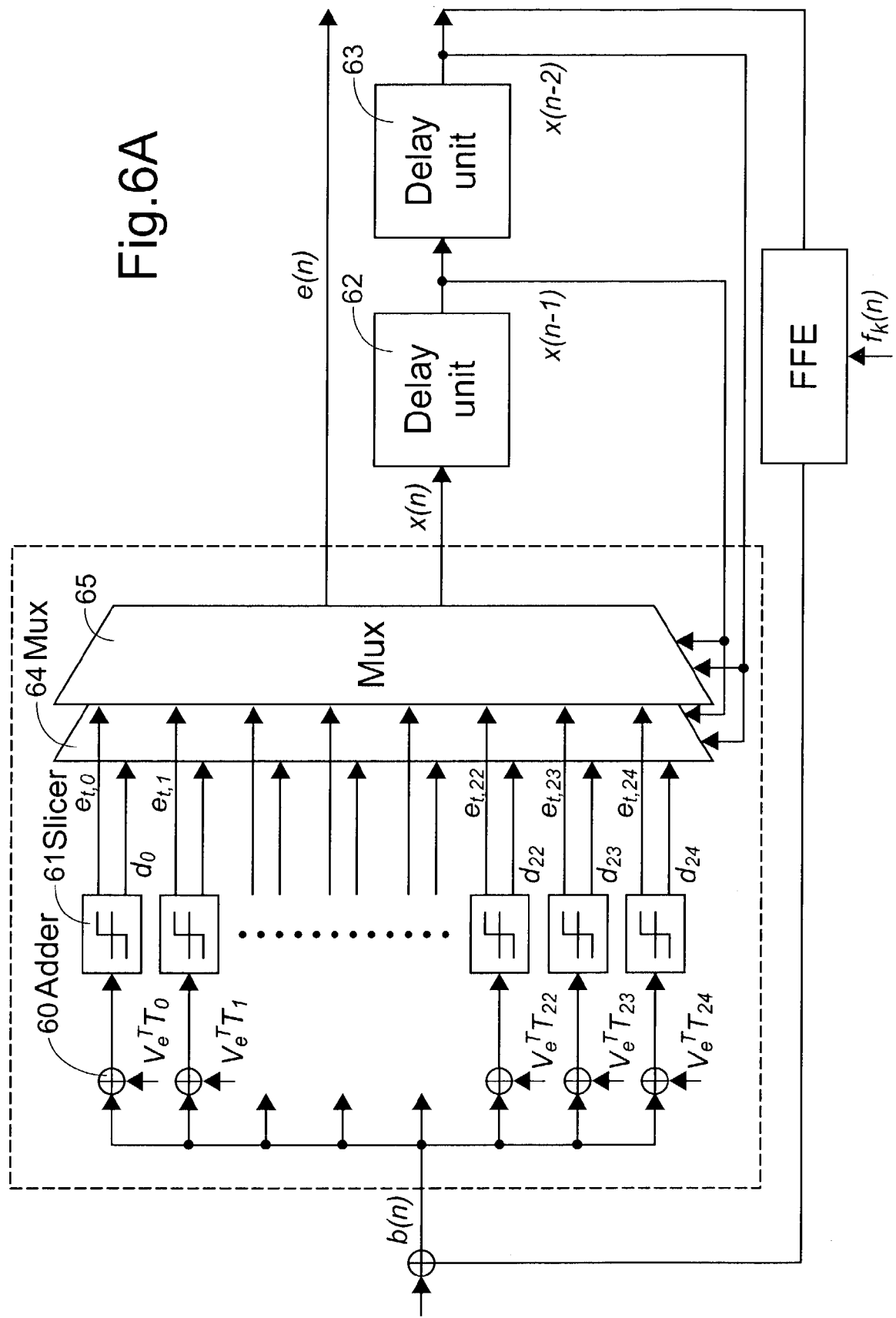
FIGS. 6A and 6B are schematic functional block diagrams showing two embodiments of the predicted parallel branch slicers for use in the adaptive decision feedback equalizer of FIG. 3.

Please refer to FIG. 6A, which is a schematic functional block diagram showing the predicted parallel branch slicer 30 in a preferred embodiment, wherein the number k of delay units is equal to 2, and the signal x(n) is a pulse amplitude modulation (PAM) signal with five levels, i.e. −2, −1, 0, 1 and 2. The predicted parallel branch slicer 30 includes twenty-five, i.e. $5^2$, adders 60 and twenty-five slicers 61 of a parallel branch structure. The value $V_e^T T$ received by the input end of each adder 60 is equal to the product of an optimal coefficient Ve=[C1, C2] and a value T of two preceding levels, where T=[a(n−1), a(n−2)]. In a 5-level case, the value T has 25 possible combinations. Two delay units 62 and 63 are additionally provided in the decision feedback loop (DLP) for use. It is apparent from the figure, the signal b(n) obtained by adding the output of the feed forward equalizer (FFE) 31 with the output of the feed back equalizer (FBE) 32 are further processed by addition and quantization operations with the 25 possible combinations so as to obtain 25 possible quantized data signals d and corresponding error signals e. The signals d and e are inputted to two 25-to-1 multiplexers 64 and 65, respectively, to be selected. The multiplexers 64 and 65 make selections based on the outputs x(n−1) and x(n−2) of the delay units 62 and 63. That is, that x(n−1) and x(n−2) are substantially which of the 25 possible combinations is determined to realize the selections of the multiplexers 64 and 65. Ideally, x(n−1) or x(n−2) will be exactly the same as one of the 25 possible combinations. Futther explanation, please refer to the paper of the inventors: IEEE workshop on Signal Processing Systems (SIPS'02). Sam Diego, Calif., USA, Oct. 16-18, 2002. In practice, however, x(n−1) or x(n−2) will be very close to rather than exactly identical to one of the 25 possible combinations due to certain noises and/or errors. Under this circumstance, one of the 25 possible combinations, which is closest to x(n−1) or x(n−2) in level, is determined, and that combination is selected to be outputted by the multiplexers 64 and 65. Herein, the term "closest to" could be viewed as the determined combination with a smallest difference among other combinations. In other words, the term "closest to" could be viewed as the following: the difference between the elements of the selected combination is smaller than the difference between the elements of any other combinations. The delay units 62 and 63 can be arranged in the FBE 32 so that the FBE 32 is divided into three groups of sub-circuits to perform pipeline operations, thereby speeding up the processing.

Figure 6B:
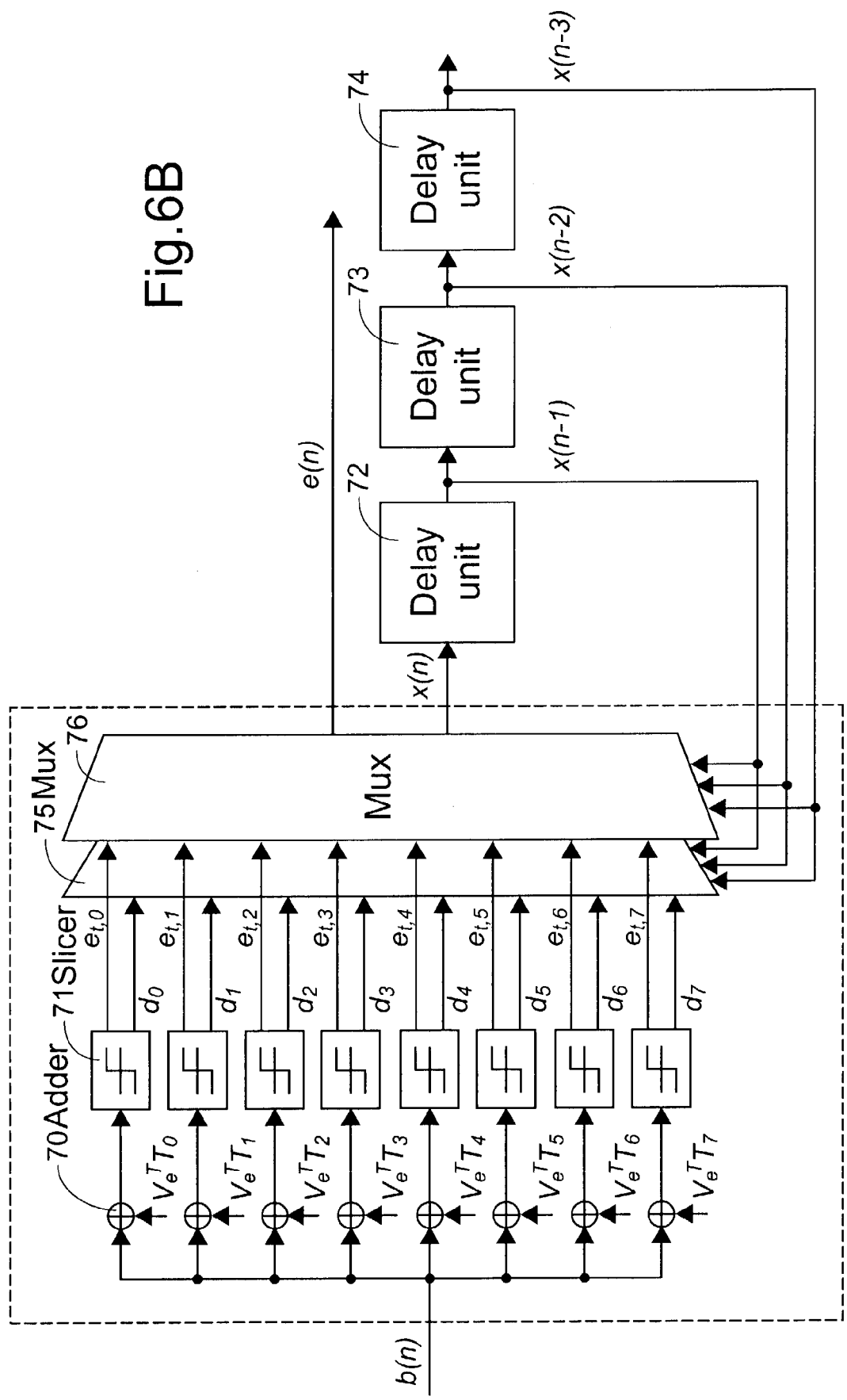

Please refer to FIG. 6B. In this embodiment of predicted parallel branch slicer 30, k is equal to 3, and the signal x(n) is a pulse amplitude modulation (PAM) signal with two levels, i.e. −1 and 1. The predicted parallel branch slicer 30 includes eight, i.e. $2^3$, adders 70 and eight slicers 71 of a parallel branch structure. The value $V_e^T T$ received by the input end of each adder 70 is equal to the product of an optimal coefficient Ve=[C1, C2, C3] and a value T of three preceding levels, where T=[a(n−1), a(n−2), a(n−3)]. In a 2-level case, the value T has 8 possible combinations. Three delay units 72, 73 and 74 are additionally provided in the decision feedback loop (DLP) for use. It is apparent from the figure, the signal b(n) outputted from the feed forward equalizer (FFE) 31 are processed by addition and quantization operations with the 8 possible combinations so as to obtain 8 possible quantized data signals d and corresponding error signals e. The signals d and e are inputted to two 8-to-1 multiplexers 75 and 76, respectively, to be selected. The multiplexers 64 and 65 make selections based on the outputs x(n−1), x(n−2) and x(n−3) of the delay units 72, 73 and 74. That is, that x(n−1), x(n−2) and x(n−3) are which of the 8 possible combinations is determined to realize the selections of the multiplexers 75 and 76. The delay units 72, 73 and 74 can be arranged in the FBE 32 so that the FBE 32 is divided into four groups of sub-circuits to perform pipeline operations, thereby speeding up the processing.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A predicted parallel branch slicer for use in an adaptive decision feedback equalizer comprising:
    adders of a number of an expression $M^k$, where M is an integer base greater than one and k is an integer exponent, commonly receiving a signal to be processed and respectively receiving $M^k$ preset values, and performing respective addition operations to generate $M^k$ output signals;
    slicers of a number of said expression $M^k$, in communication with said $M^k$ adders, receiving and processing said $M^k$ output signals to obtain $M^k$ signals corresponding respectively to $M^k$ levels, respectively;
    a multiplexer in communication with said $M^k$ slicers, receiving said $M^k$ signals; and
    delay units of a number k, interconnected with one another in series and being in communication with said multiplexer, and generating k selection signals of different delay time in response to an output of said multiplexer, said selection signals being provided for said multiplexer to select one of said $M^k$ signals to be outputted;
    wherein the preset value $V_e^T T$ received by each of said $M^k$ adders at a sampled point n is equal to the product of an optimal coefficient Ve=[C1, C2, . . . Ck] and a value T=[a(n−1), a(n−2), . . . , a(n−k)], where C1, C2, . . . , Ck are constant coefficients realized according to a simulated waveform of a channel impulse response on a transmission line of Gigabit Ethernet, and a(n−1), a(n−2), . . . , a(n−k) are levels realized at preceding k time points.

2. The predicted parallel branch slicer according to claim 1 wherein each of said $M^k$ signals a data signal and a error signal.

3. The predicted parallel branch slicer according to claim 1 wherein said multiplexer is a combination of a first multiplexer and a second multiplexer, which are in communication with said $M^k$ slicers and said k serially interconnected delay units.

4. The predicted parallel branch slicer according to claim 3 wherein each of said $M^k$ signals includes a data signal and an error signal.

5. The predicted parallel branch slicer according to claim 4 wherein said first multiplexer receives said data signals of said $M^k$ signals and said selection signals from said delay units, said second multiplexer receives said error signals of said $M^k$ signals and said selection signals from said delay units, and said second multiplexer selects said at least one output according to an output of said first multiplexer.

6. The predicted parallel branch slicer according to claim 4 wherein said one of said $M^k$ signals selected to be outputted by said multiplexer is the one including a data signal with the smallest level difference from a corresponding one of said selection signals.

7. The predicted parallel branch slicer according to claim 4 wherein said one of said $M^k$ signals selected to be outputted by said multiplexer is the one having an error signal with the smallest level difference from a corresponding one of said selection signals.

8. The predicted parallel branch slicer according to claim 1 wherein said one of said $M^k$ signals selected to be outputted by said multiplexer is the one with the smallest level difference from a corresponding one of said selection signals.

9. A predicted parallel branch slicing method for use in an adaptive decision feedback equalizer, comprising steps of:
realizing the first k coefficients of a feed back equalizer according to a channel feature, and operating to obtain $M^k$ preset values, where M is a an integer base greater than one and k is an integer exponent;
operating upon a received signal to be processed and said $M^k$ preset values to obtain $M^k$ output signals;
respectively receiving and slicing said $M^k$ output signals to obtain $M^k$ signals corresponding respectively to $M^k$ slicing levels;
selecting one of said $M^k$ signals; and
generating a plurality of selection signals of k kinds of different delay time according to said selected one of said $M^k$ signals and k different delay operations, and selecting said one of said $M^k$ signals to be outputted according to the selection signals;
wherein any of said $M^k$ preset values is equal to a product of k-level optimal coefficients and slicing levels realized at preceding k time points.

10. The predicted parallel branch slicing method according to claim 9 wherein a certain one of said $M^k$ signals and a corresponding one of said selection signals, which have a smallest difference in levels, are determined, and said selected one of said $M^k$ signals is selected to be outputted accordingly.

11. The predicted parallel branch slicing method according to claim 10 wherein each of said $M^k$ signals includes a data signal and an error signal.

12. The predicted parallel branch slicing method according to claim 11 wherein a certain one of said data signals of $M^k$ signals and a certain one of said selection signals, which have a smallest difference in levels, are determined, and said selected one of said data signals of said $M^k$ signals is selected to be outputted accordingly.

13. The predicted parallel branch slicing method according to claim 9 wherein said k-level optimal coefficients are realized according to a simulated waveform of a channel impulse response on a transmission line of Gigabit Ethernet.

14. A predicted parallel branch slicing method for use in an adaptive decision feedback equalizer, comprising steps of:
realizing the first k coefficients of a feed back equalizer according to a channel feature, and operating to obtain $M^k$ preset values, where M is a an integer base greater than one and k is an integer exponent;
operating upon a received signal to be processed and said $M^k$ preset value, to obtain $M^k$ output signals;
respectively receiving and slicing said $M^k$ output signals to obtain $M^k$ signals corresponding respectively to $M^k$ slicing levels;
selecting a one of said $M^k$ signals; and
generating a plurality of selection signals of k kinds of different delay time according to said selected one of said $M^k$ signals and k different delay operations, and selecting said one of said $M^k$ signals to be outputted according to the selection signals;
wherein said k-level optimal coefficients are realized according to a simulated waveform of a channel impulse response on a transmission line of Gigabit Ethernet and slicing levels realized at preceding k time points.

* * * * *

UNITED STATES PATENT AND TRADEMARK OFFICE
CERTIFICATE OF CORRECTION

| | |
|---|---|
| PATENT NO. | : 7,317,755 B2 |
| APPLICATION NO. | : 10/442560 |
| DATED | : January 8, 2008 |
| INVENTOR(S) | : Meng-Da Yang et al. |

It is certified that error appears in the above-identified patent and that said Letters Patent is hereby corrected as shown below:

In column 7 line 30 claim 9, please delete "where M is a an" and replace it with --where M is an--.

In column 8 line 33 claim 14, please delete "selecting a one" and replace it with --selecting one--.

Signed and Sealed this

Twelfth Day of August, 2008

JON W. DUDAS
*Director of the United States Patent and Trademark Office*